(12) United States Patent
Farris et al.

(10) Patent No.: US 7,407,051 B1
(45) Date of Patent: Aug. 5, 2008

(54) NOZZLELESS CONVEYOR BELT AND SPROCKET CLEANING SHAFT

(76) Inventors: Mike Farris, 1047 Gardenia Dr., Houston, TX (US) 77018; Douglas I. Manchester, 1614 Isom, Houston, TX (US) 77039

( * ) Notice: Subject to any disclaimer, the term of this patent is extended or adjusted under 35 U.S.C. 154(b) by 14 days.

(21) Appl. No.: 11/786,163

(22) Filed: Apr. 11, 2007

(51) Int. Cl.
*B65G 45/00* (2006.01)
(52) U.S. Cl. .................. 198/495; 134/131
(58) Field of Classification Search .......... 198/495; 134/122 R, 124, 131; 474/92
See application file for complete search history.

(56) References Cited

U.S. PATENT DOCUMENTS

| | | | | |
|---|---|---|---|---|
| 3,016,235 | A * | 1/1962 | Cnudde | 432/228 |
| 5,613,594 | A * | 3/1997 | Kootsouradis | 198/495 |
| 6,223,905 | B1 * | 5/2001 | Buisman et al. | 209/261 |
| 6,367,613 | B1 | 4/2002 | Montgomery | |
| 6,740,172 | B1 | 5/2004 | Griffiths et al. | |
| 6,978,880 | B2 | 12/2005 | Barrett | |
| 7,055,675 | B2 * | 6/2006 | Behymer et al. | 198/496 |
| RE39,186 | E * | 7/2006 | Montgomery | 198/495 |
| 7,111,724 | B2 * | 9/2006 | Donnenhoffer | 198/807 |
| 7,147,099 | B2 * | 12/2006 | Guernsey et al. | 198/834 |
| 7,225,915 | B2 * | 6/2007 | Kelly et al. | 198/495 |
| 2002/0117381 | A1 | 8/2002 | Montgomery | |
| 2005/0241921 | A1 * | 11/2005 | Guernsey et al. | |
| 2007/0084699 | A1 * | 4/2007 | Smith | |

* cited by examiner

*Primary Examiner*—Douglas A Hess
(74) *Attorney, Agent, or Firm*—Kenneth A. Roddy

(57) ABSTRACT

A nozzleless belt-cleaning sprocket support shaft for cleaning endless conveyor belts has a first end, a second end, a central portion of generally square transverse cross section with a plurality of elongate narrow slits in each of the side walls in longitudinally spaced apart relation along its length, and a plurality of sprockets mounted thereon. Cleaning fluid is simultaneously discharged through the slits in a fan spray pattern onto the inside surface of the conveyor, through crevasses, joints, hinges, interfaces and openings in the belt to effect cleaning of the belt, and between the exterior surfaces of the shaft and interior surfaces of the bores of the sprockets and the bearings that support the shaft to effect cleaning of the overlapping surfaces, during rotation of the belt. The cleaning shaft may be used with various types of conveyor belts and the ends may be mounted in conventional bearings.

12 Claims, 4 Drawing Sheets

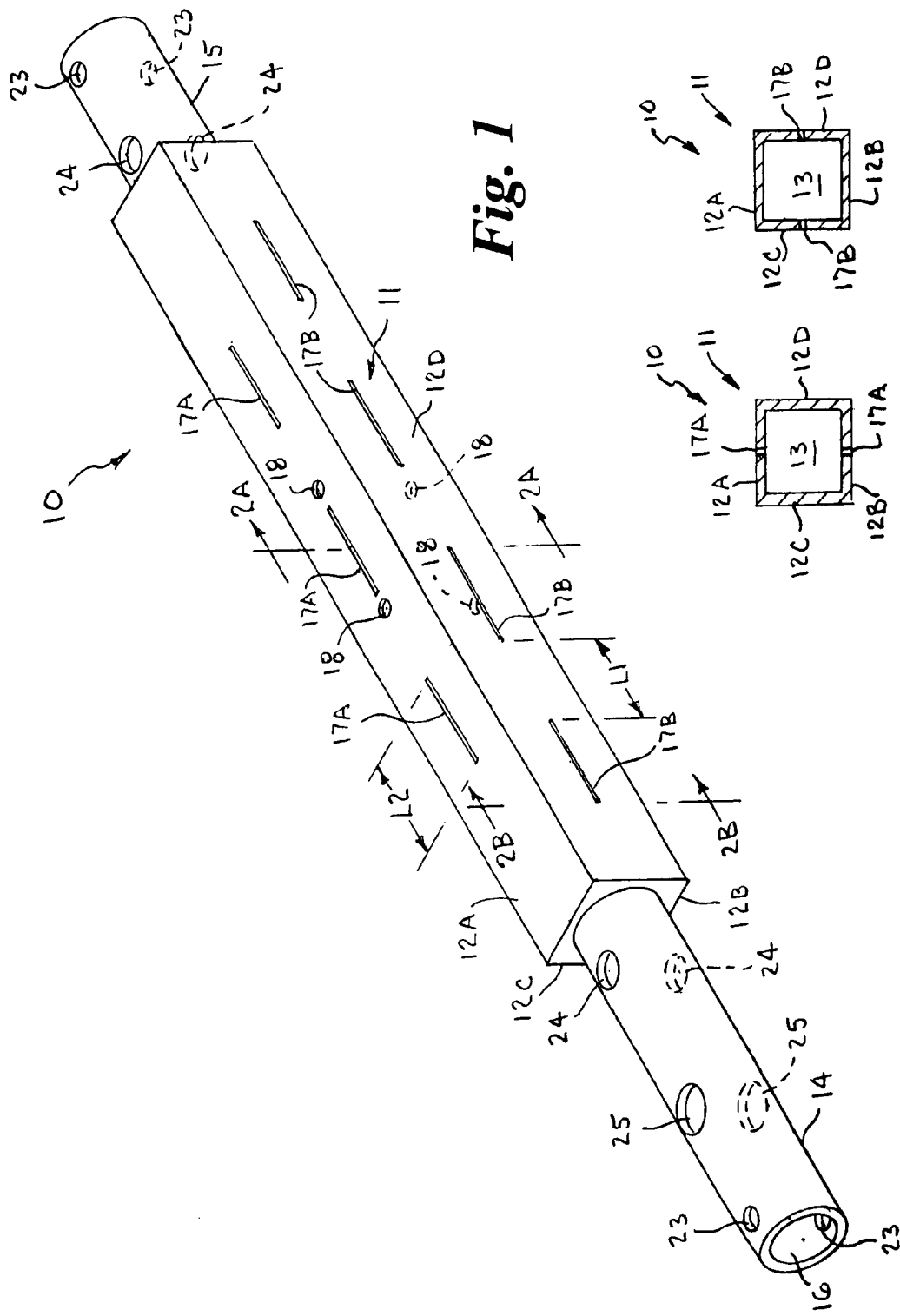

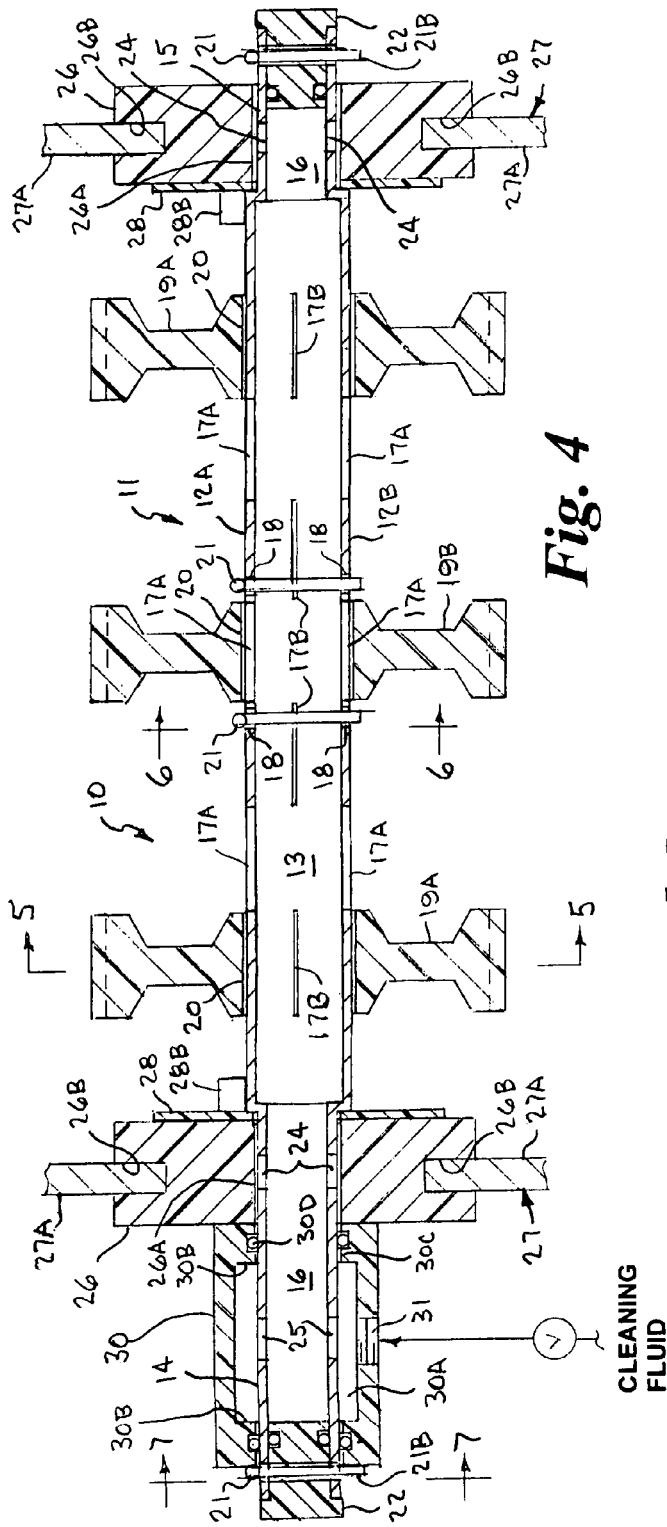
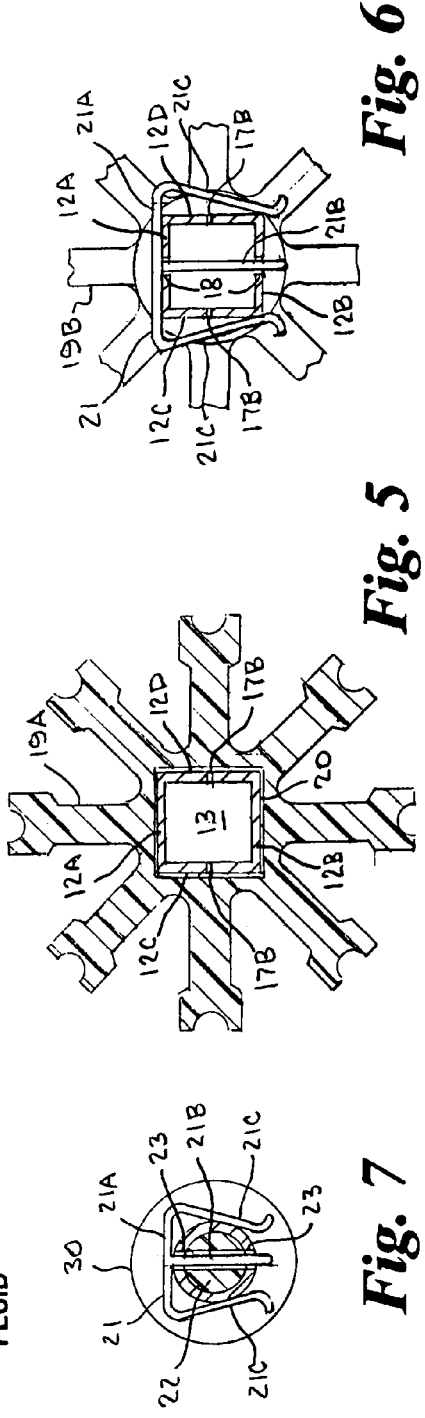
Fig. 4
Fig. 5
Fig. 6
Fig. 7

NOZZLELESS CONVEYOR BELT AND SPROCKET CLEANING SHAFT

BACKGROUND OF THE INVENTION

1. Field of the Invention

This invention relates generally to endless conveyor belt cleaning systems, and more particularly to a nozzleless conveyor belt sprocket support shaft that discharges a cleaning fluid through a plurality of narrow slits to clean the belt, sprockets, and bearings while the conveyor is operating.

2. Background Art

Conveyors comprising sprocket-driven endless belts are typically used for the transport of many articles including produce and food products. The items being transported may leak or ooze liquids of varying viscosity, or shed dust, dirt, particles or debris that can accumulate on the belt and foul the conveyor. In food processing plants, where cuts of meat, poultry, fish and other consumable food products are transported on conveyors, sanitation is a primary concern, because these types of food products ooze blood, deposit viscous or congealed fat, cartilage, muscle, and other animal carcass liquids and debris onto the belt and other components of the conveyor system. Such organic matter, if allowed to accumulate on the belt and/or other components, presents a health hazard because it quickly decays, and can cause growth of bacteria, biofilms, and cross-contamination. Thus, the conveyors must be maintained in a clean and hygienic condition to meet sanitary standards. Some regulations require that the food conveyor be washed-down several times a day, and be taken apart and completely cleaned every twenty-four hours. The cleaning requirements cause a necessary, but time-consuming, downtime of the equipment and delay in production, and additional time and effort must be expended to re-assemble the conveyor.

"Modular" or "table top" type conveyors are widely used in food handling and processing, wherein the conveyor belts or chains are made of a series of small modules or links formed of temperature resistant easily cleanable plastic material that are interconnected in laterally adjacent relation in a hinge-like manner by connection pins or rods installed through overlapping apertures in the modules or links to form an endless loop. One end of the endless belt passes over one or more drive sprockets, and its opposed end passes over one or more idler sprockets.

One of the major problems with these types of conveyor systems is that, organic matter and the various liquids and debris tend to work their way into and through crevasses, joints, hinges, interfaces and openings in the belt and a substantial amount of unwanted organic matter thereby accumulates on the inside surface of the belt and on the drive components such as the drive sprockets, idler sprockets and support rollers. Generally, the inside surface of the belt and the drive components are not easily accessible for cleaning, requiring that the conveyor be regularly shut down and disassembled to effect a thorough cleaning.

Another problem with these types of conveyor systems is that the structural components and the drive and idler sprocket assemblies are constructed and/or assembled in a manner that produces ledges, pockets, exposed screw threads, exposed nuts or fasteners, surfaces that overlap and form laminations, all of which also tend to accumulate liquids and debris from the food being transported and present a health hazard due to growth of bacteria, biofilms, and cross-contamination.

Several conventional approaches to cleaning conveyor systems include dismantling the system and manually cleaning the components by hand, or providing cleaning devices as part of the conveyor system, such as a roller to rinse the belts, spraying systems utilizing nozzles to spray cleaning fluids onto the belts, or scrubbers and brushes that engage the belts.

There are several patents directed toward various cleaning apparatus that utilize nozzles installed on sprockets, or nozzles installed on the shaft that support the sprockets. As used herein, the term "nozzle" has its usual definition; e.g., "a projecting part with an opening, as at the end of a hose, for regulating and directing a flow of fluid" (*The American Heritage® Dictionary of the English Language, Fourth Edition*), or "a short tube with a taper or constriction used (as on a hose) to speed up or direct a flow of fluid" (*Merriam-Webster Online Dictionary*). The term "slit" has its usual definition; e.g., "a long, straight, narrow cut or opening" (*The American Heritage® Dictionary of the English Language, Fourth Edition*), or "a long narrow cut or opening" (*Merriam-Webster Online Dictionary*).

Montgomery, U.S. Pat. No. 6,367,613 and Published Application 2002/0117381 discloses a single elongate longitudinal sprocket adapted to spray a fluid for cleaning an endless conveyor belt. The elongate sprocket has a width substantially the same as the width of the conveyor belt, an outer circumferential surface with radially spaced longitudinal teeth for supporting an inwardly facing surface of the belt, a fluid conduit extending lengthwise within the body from one end thereof, and a plurality outlet passages formed in the sprocket extending radially from the fluid conduit terminating in apertures disposed in the valley between the teeth positioned along the length of the sprocket in a helical path, and nozzles are preferably fitted in the apertures between the teeth.

One of the disadvantages of the single elongated sprocket cleaning system of U.S. Pat. No. 6,367,613 and Published Application 2002/0117381 is that the plurality of nozzles project from the valley surface of the sprocket between radially spaced longitudinal teeth, thus, the nozzles and sprocket assembly provides exposed projecting surface areas that could accumulate liquids and debris and promote growth of bacteria, biofilms, and cross-contamination. The placement of the nozzles also limits the coverage area for fluids being emitted from the nozzles onto the conveyor belt.

Griffiths, et al, U.S. Pat. No. 6,740,172 discloses a modular belt-cleaning apparatus having sprockets rotatably mounted on a non-rotating hollow shaft. Each sprocket includes a first pair of diametrically opposed generally pie-shaped sectors and a second pair of diametrically opposed generally pie-shaped sectors that are laterally staggered in relation to the first pair of sectors to provide a space therebetween. The pie-shaped sprocket sectors are mounted on hubs fixed to the shaft by set screws or snap rings. Each sprocket is flanked by a pair of nozzles mounted on the stationary hollow shaft, each of which produces a fan-shaped spray that overlap one another across the lateral extent of the conveyor belt and are angled relative to one another so as not interfere with one another, and the nozzles are positioned to clean the hinges of the belt when the hinges are open.

One of the disadvantages of the pie-shaped sector sprocket assembly of U.S. Pat. No. 6,740,172 is that the nozzles and set screws or snap rings provide exposed screw threads and projecting surface areas, and the laterally mounted pie-shaped sectors and hubs provide overlapping surfaces, which could accumulate liquids and debris and promote growth of bacteria, biofilms, and cross-contamination. The nozzle and sprocket arrangement also requires time and labor to remove and reinstall a plurality of nozzles each time a sprocket is replaced, or when the sprocket assembly is dismantled for cleaning. The nozzles are also fixed to the non-rotating shaft and do not rotate along with the conveyor belt, which limits the coverage area for fluids being emitted from the nozzles onto the conveyor belt.

Barrett, U.S. Pat. No. 6,978,880 discloses a conveyor belt cleaning bar having a first end, a second end, a mid portion having a square-shaped transverse cross section, a plurality of nozzles fitted into apertures in the square-shaped mid portion to extend outwardly from the outer surface of the mid portion, and sprockets having a square-shaped bore installed on the outer surface of the square-shaped mid portion, with at least one of the sprockets disposed between at least two nozzles. The nozzles define a spray pattern that surrounds the bar and converges upon the entire width of a conveyor belt.

One of the disadvantages of the conveyor belt cleaning sprocket assembly of U.S. Pat. No. 6,978,880 is that the outwardly extending nozzles provide exposed screw threads and projecting surface areas, and the square bar and bore of the mounting arrangement of the sprockets provides overlapping flat surfaces, which could accumulate liquids and debris and promote growth of bacteria, biofilms, and cross-contamination. The nozzle and sprocket arrangement also requires time and labor to remove and reinstall a plurality of nozzles each time a sprocket is replaced, or when the sprocket assembly is dismantled for cleaning.

The present invention overcomes the aforementioned problems and is distinguished over the prior art in general, and these patents in particular by a nozzleless belt-cleaning sprocket support shaft for cleaning endless conveyor belts and the sprockets supported thereon. The shaft has a first end, a second end, a central portion of generally square transverse cross section with a plurality of elongate narrow slits in each of the side walls in longitudinally spaced apart relation along its length, and a plurality of sprockets mounted thereon. Cleaning fluid is simultaneously discharged through the slits in a fan spray pattern onto the inside surface of the conveyor, through crevasses, joints, hinges, interfaces and openings in the belt to effect cleaning of the belt, and between the exterior surfaces of the shaft and interior surfaces of the bores of the sprockets and the bearings that support the shaft to effect cleaning of the overlapping surfaces, during rotation of the belt. The ends may also be configured for use with conventional bearings.

SUMMARY OF THE INVENTION

It is therefore an object of the present invention to provide a nozzleless belt-cleaning sprocket support shaft for cleaning endless conveyor belts and the sprockets supported thereon that eliminates the need for nozzles that project from the surface of the shaft and their inherent exposed screw threads and exposed projecting surface areas, which tend to accumulate liquids and debris and promote growth of bacteria, biofilms, and cross-contamination.

It is another object of this invention to provide a nozzleless belt-cleaning sprocket support shaft for cleaning endless conveyor belts and the sprockets supported thereon that discharges cleaning fluid under pressure through a plurality of elongate narrow longitudinally spaced offset slits in a wide fan spray pattern onto the inside surface of the conveyor belt and through crevasses, joints, hinges, interfaces and openings in the belt to effect efficient cleaning of the belt.

It is another object of the present invention to provide a nozzleless belt-cleaning sprocket support shaft for cleaning endless conveyor belts and the sprockets supported thereon that discharges cleaning fluid under pressure between the exterior surfaces of the shaft and interior surfaces of the bore of the sprockets supported thereon to efficiently clean the overlapping surfaces, which would otherwise tend to accumulate liquids and debris and promote growth of bacteria, biofilms, and cross-contamination.

It is another object of the present invention to provide a nozzleless belt-cleaning sprocket support shaft for endless conveyor belts and the sprockets supported thereon that discharges cleaning fluid under pressure between the exterior surface of the end portions of the shaft and interior surface of the bore of the bearings that support the shaft to efficiently clean the overlapping surfaces, which would otherwise tend to accumulate liquids and debris and promote growth of bacteria, biofilms, and cross-contamination.

Another object of this invention is to provide a nozzleless belt-cleaning sprocket support shaft for cleaning endless conveyor belts and the sprockets supported thereon that simultaneously discharges cleaning fluid under pressure through a plurality of elongate narrow longitudinally spaced offset slits in a wide fan spray pattern onto the inside surface of the conveyor, through crevasses, joints, hinges, interfaces and openings in the belt to effect cleaning of the belt, and simultaneously discharges the cleaning fluid between the exterior surfaces of the shaft and interior surfaces of the bores of the sprockets and the bearings that support the shaft to efficiently clean the overlapping surfaces, during rotation of the belt.

Another object of this invention is to provide a provide a nozzleless belt-cleaning sprocket support shaft for cleaning endless conveyor belts and the sprockets supported thereon that does not require removing and reinstalling a plurality of nozzles each time a sprocket is replaced, or when the sprocket assembly is dismantled for cleaning, and thereby significantly reduces downtime of the equipment, delay in production, and time and labor in assembly re-assembly operations.

Another object of this invention is to provide a nozzleless belt-cleaning sprocket support shaft for cleaning endless conveyor belts and the sprockets supported thereon that eliminates the problem of plugged nozzles and frequent nozzle replacement.

A further object of this invention is to provide a nozzleless belt-cleaning sprocket support shaft for cleaning endless conveyor belts and the sprockets supported thereon that is easily and quickly assembled and disassembled in a matter of minutes without the use of tools and does not require threaded fasteners to mount the sprockets onto the shaft.

A still further object of this invention is to provide a nozzleless belt-cleaning sprocket support shaft for cleaning endless conveyor belts and the sprockets supported thereon that is simple in construction, inexpensive to manufacture, and is rugged and reliable in operation.

Other objects of the invention will become apparent from time to time throughout the specification and claims as hereinafter related.

The above noted objects and other objects of the invention are accomplished a nozzleless belt-cleaning sprocket support shaft for cleaning endless conveyor belts and the sprockets supported thereon. The shaft has a first end, a second end, a central portion of generally square transverse cross section with a plurality of elongate narrow slits in each of the side walls in longitudinally spaced apart relation along its length, and a plurality of sprockets mounted thereon. Cleaning fluid is simultaneously discharged through the slits in a fan spray pattern onto the inside surface of the conveyor, through crevasses, joints, hinges, interfaces and openings in the belt to effect cleaning of the belt, and between the exterior surfaces of the shaft and interior surfaces of the bores of the sprockets and the bearings that support the shaft to effect cleaning of the overlapping surfaces, during rotation of the belt. The cleaning shaft may be used with various types of conveyor belts and the ends may be mounted in conventional bearings.

BRIEF DESCRIPTION OF THE DRAWINGS

FIG. 1 is an isometric view of the nozzleless belt-cleaning sprocket support shaft in accordance with the present invention, shown without the sprockets and end plugs to more clearly show the slits in the square central portion of the shaft.

FIGS. 2A and 2B are transverse cross sections of the nozzleless belt-cleaning sprocket support shaft, taken along lines 2A and 2B, respectively, of FIG. 1 showing slots in the side walls of the shaft.

FIG. 4 is a longitudinal cross section of the nozzleless belt-cleaning sprocket support shaft, taken along line 4-4 of FIG. 3, shown with a rotary union installed on one end.

FIG. 5 is a transverse cross section, taken along line 5-5 of FIG. 4, showing a sprocket member mounted over slits in the laterally opposed side walls of the central portion of the shaft.

FIG. 6 is a transverse cross section, taken along line 6-6 of FIG. 4, showing a retaining clip installed to retain the central sprocket member.

FIG. 7 is a transverse cross section, taken along line 7-7 of FIG. 4, showing a retaining clip installed to retain the plug in the outer end of the shaft.

DESCRIPTION OF THE PREFERRED EMBODIMENTS

Figure 3:
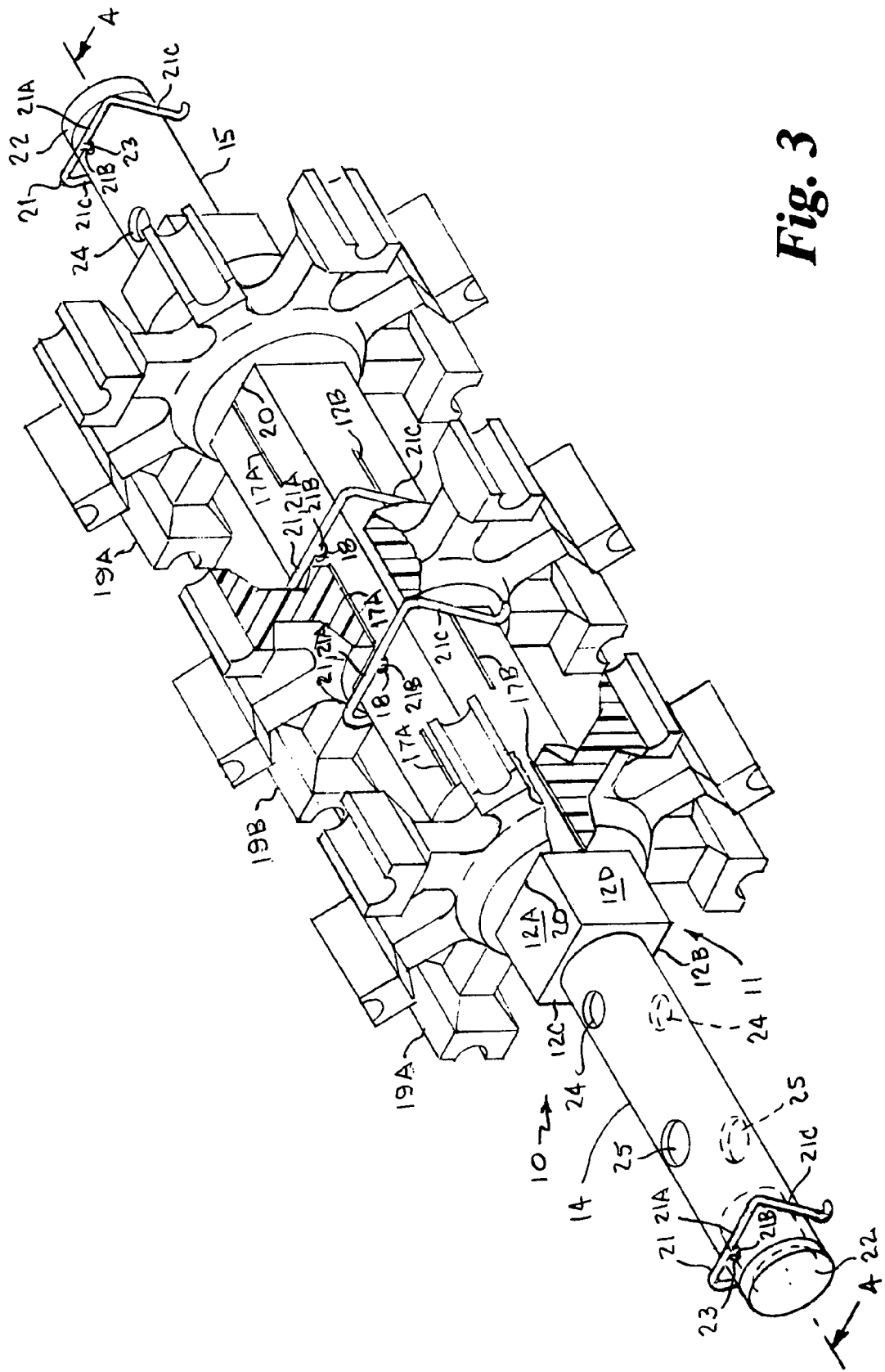
FIG. 3 is an isometric view of the nozzleless belt-cleaning sprocket support shaft, shown with the sprockets and end plugs installed.

Referring to the drawings by numerals of reference, there is shown in FIGS. 1, 2A and 2B, a preferred nozzleless belt-cleaning sprocket support shaft 10 for cleaning endless conveyor belts and the sprockets supported thereon. The sprocket support shaft 10 has an elongate hollow midsection or central portion 11 of square transverse cross section with parallel spaced opposed side walls 12A, 12B, 12C and 12D, defining a central interior chamber 13, and cylindrical opposed ends 14 and 15 extending axially outward therefrom. One cylindrical end 14 is longer than the other end 15. A central bore 16 extends axially through the opposed cylindrical ends 14, 15 in communication with the interior chamber 13 of the hollow central portion 11.

A plurality of elongate narrow slits 17A and 27B are formed in the side walls 12A, 12B, 12C and 12D in longitudinally spaced apart relation along the length of the square midsection or central portion 11. The slits 17A of two opposed side walls 12A and 12B are longitudinally offset from the slits 17B of the adjacent opposed side walls 12C and 12D. In a preferred embodiment the longitudinal space L1 between each of the slits is the same length as the length L2 of the slits.

For example, if the slits are all 1½" in length, the slits 17A of opposed side walls 12A and 12B would be spaced 1½" apart and slits 17B of the adjacent opposed side walls 12C and 12D would be longitudinally offset a distance of 1½" from the slits 17A.

The square midsection or central portion 11 is provided with a pair of longitudinally spaced apart small holes 18 extending transversely through the opposed side walls 12A and 12B near its center.

Referring additionally to FIG. 3, a pair of lateral sprockets 19A and a center sprocket 19B, each having a square-shaped central bore 20, are slidably received and removably mounted on the exterior of the central portion 11 of the sprocket support shaft 11 in longitudinally spaced relation to rotate therewith. The outer periphery of the sprockets 19A, 19B are toothed or otherwise configured to engage a conventional modular conveyor belt or table top chain type belt.

The center sprocket 19B is disposed between the holes 18, and its lateral movement on the midsection or central portion 11 is controlled by a pair of spring retainer clips 21. Each spring retainer clip 21 has a horizontal portion 21A, a central straight pin portion 21B, and a pair of resilient arm portions 21C extending downwardly and inwardly from each end of the horizontal portion in laterally opposed relation. The spring retainer clips 21 are removably installed on the shaft 10, one at each side of the center sprocket 19B, by inserting its pin 21B into a respective pair of the holes 18 such that its arm portions 21C encompass opposed sides of the shaft in laterally inward spring biased relation. It should be understood that, depending upon the width of the conveyor, there may be a few as one sprocket or there may be a plurality of sprockets. Depending upon the particular installation and belt size, the lateral sprockets 19A may be installed without clips, or may be clipped in place in the same manner as the center sprocket 19B.

As shown in FIGS. 3, 4, 7 and 8, in a first preferred embodiment, the does not require the use of tools for assembly or disassembly, a plug 22 is removably installed the outer end of each central bore 16 of the opposed cylindrical ends 14 and 15. The side wall of each opposed cylindrical end 14 and 14 is provided with a first pair of diametrically opposed small diameter holes 23 near its outer end, and a pair of diametrically opposed larger diameter fluid outlet holes 24 disposed near the square central portion 11. The longer cylindrical end 14 is provided with a pair of diametrically opposed fluid inlet holes 25 disposed between the holes 23 and 24.

Figure 8:
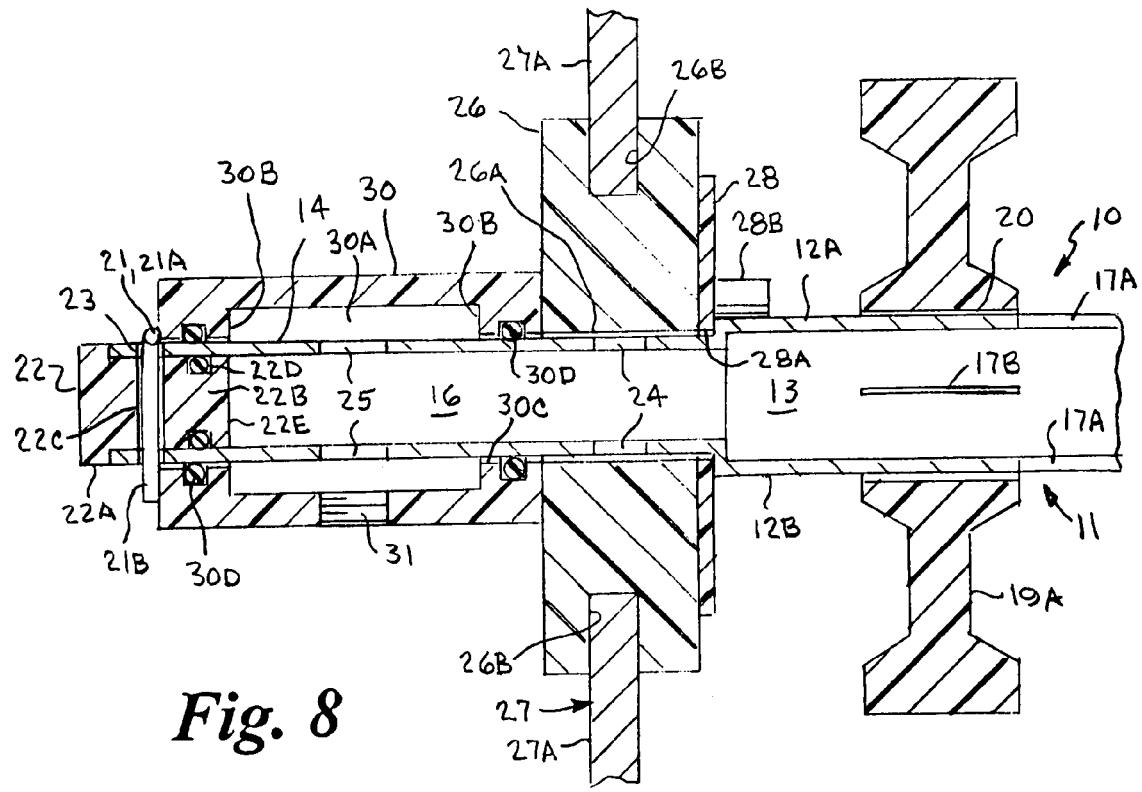
FIG. 8 is an enlarged longitudinal cross section through the longer outer end of the nozzleless belt-cleaning sprocket support shaft, showing the rotary union installed on one end adjacent to a non-lubricated bearing.

As shown in FIG. 8, the plug 22 has larger diameter flange or head 22A at one end and a reduced diameter body 22B provided with a transverse bore 22C and a circumferential O-ring seal 22D near its inward facing end 22E that engages the respective bore 16 in a fluid sealing relation. Each plug 22 is removably secured in the outer end of the respective bore 16 by a spring retainer clip 21 having its pin portion 21B extending through the small diameter holes 23 of the respective cylindrical end 14, 15, and the transverse bore 22C in the body of the plug.

Referring additionally to FIGS. 4 and 8, in this embodiment, the opposed cylindrical ends 14, 15 of the shaft 10 are rotatably supported in the central bore 26A of a respective generally rectangular roller support bearing 26. Each roller support bearing 26 has a longitudinal slot 26B in its top and bottom side surfaces that are slidably and removably received on vertically opposed surfaces 27A of a slot at the end of lateral side panels 27 of the a conveyor bed frame.

A disk-shaped thrust washer 28 formed of low-friction material having a central bore 28A is slidably received on each of the cylindrical ends 14, 15 of the shaft 10. Each thrust washer 28 has a short pin 28B radially spaced from the central bore 28A extending outward from its inner facing side. The inner facing side of each thrust washer 28 is in contact with one end of the rectangular central portion 11 of the shaft 10 with its pin 28BB received on a flat side 12A of the rectangular central portion and its opposed side is in contact with an inner facing surface of a respective one of the bearing members 26. Thus, the thrust washer 28 rotates with the shaft 10 relative to the bearing members 26 to reduce friction and prevent wear between the rectangular portion 11 and bearing.

The thrust washers 28 and bearings 26 are installed on the opposed cylindrical ends 14, of the shaft 10 prior to installing the clip 21 to retain the plugs 22. When the bearings 26 are installed, the interior surface of the central bore 26A of the bearings overlap the larger diameter fluid outlet holes 24 in the cylindrical ends 14, 15 of the shaft 10.

As shown in FIGS. 4, 7 and 8, in some installations, a cylindrical rotary union 30 which is used to introduce a cleaning fluid into to the sprocket support shaft 10 during the cleaning operation (described hereinafter) is installed on the longer cylindrical end 14. However, it should be understood, that the shaft 10 may also be used without the rotary union 30 installed. The rotary union 30 has a central interior cylindrical cavity 30A with opposed end walls 30B, each having a smaller diameter axial bore 30C with an O-ring groove and an O-ring 30D installed therein. The O-rings 30D straddle the diametrically opposed larger diameter fluid passageway holes 25 in the cylindrical end 14 and engage the exterior of the cylindrical end in a rotary fluid sealing relation. The side wall of the rotary union 30 is provided with a threaded fluid inlet passageway 31 in fluid communication with the interior cylindrical cavity 30A for connecting a fluid hose equipped with an on-off valve V to provide cleaning fluid under pressure into the cavity. The spring retainer clip 21 which is used to secure the plug 22 engages the outer end of rotary union 30 and retains it in a position with its inner facing end disposed closely adjacent to the bearing 26.

The roller support bearings 26 and thrust washers 28 are non-lubricated and, preferably, are made of plastic that is approved by the USDA and FDA for food grade service. The sprocket members 19A, 19B are also preferably made of plastic that is approved by the USDA and FDA for food grade service. All of the components of the present invention can be steam cleaned or chemically cleaned.

Figure 9:
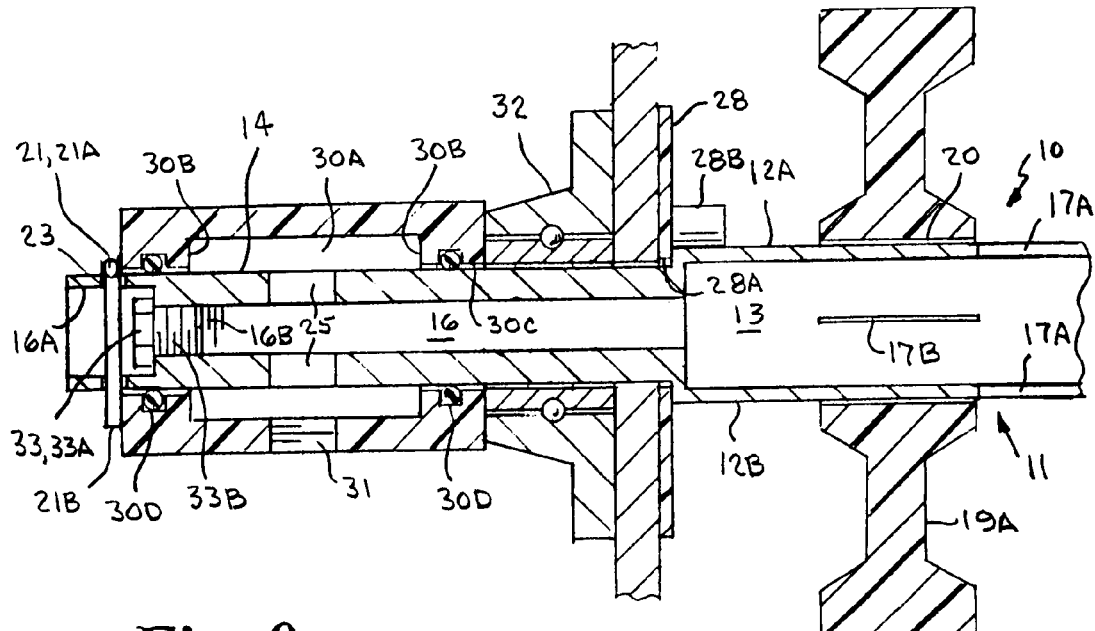
FIG. 9 is an enlarged longitudinal cross section through the longer outer end of the nozzleless belt-cleaning sprocket support shaft, showing the rotary union installed on one end adjacent to a conventional bearing.

Referring now to FIG. 9, there is shown an alternate embodiment of the shaft mounting arrangement, wherein the opposed cylindrical ends 14, 15 of the shaft 10 are rotatably supported in conventional pillow block or flanged bearings 32. The components previously described are assigned the same numerals of reference, but will not be described again in detail to avoid repetition. Pillow block and flanged bearings are well known in the art and therefore the exemplary bearing is represented somewhat schematically and the details are not described and shown in detail. In this embodiment, the exterior of the opposed cylindrical ends 14, 15 are machined to fit rotatably in the particular size of bearings used, the outer ends of the opposed cylindrical ends are provided with an inwardly extending counterbore 16A, and the outer ends of the central bores 16 are provided with an internally threaded portion 16B. Only one end 14 is shown, and it should be understood that the other end 15 is essentially the same as the end 14, but shorter. A pipe plug 33 having a larger head 33A at one end and a reduced diameter externally threaded body 33B is threadedly engaged in the internally threaded portion 16B of the central bore 16 of each of the opposed cylindrical ends 14, 15 with its head disposed within the counterbore 16A.

As with the previously described embodiment, in this embodiment, the side wall of each opposed cylindrical end 14, 15 is provided with a pair of diametrically opposed small diameter holes 23 near its outer end, for receiving a clip 21, and the longer end 14 is provided with a pair of diametrically opposed larger diameter fluid inlet holes 25 disposed a distance inwardly from the smaller diameter holes. However, since the cylindrical ends 14, 15 are rotatably supported in conventional bearings, the fluid outlet holes 24 are not required in this embodiment.

In both embodiments, the rectangular central portion 11 and cylindrical ends 14, 15 of the sprocket support shaft 10 are preferably formed of stainless steel or other suitable metal and, in some applications, may be surface finished by electropolishing. Electropolishing is an electrochemical process that provides metal surfaces with a microscopic featureless surface which provides ultra-clean, ultra-smooth surfaces. This process is typically performed by submerging the part in an acid bath and providing a means of contact to a direct electrical current. Electropolishing is similar to plating except, in plating, the part is cathodic and attracts the metal being plated onto the part, while in electropolishing the part is anodic which allows the surface to give up material (metal) ion by ion. Simply stated, the microscopic peaks or high spots on the metals have a greater electrical potential while electropolishing is taking place effectively dissolving these peaks at a faster rate than the areas around the feature. The end result is a surface where all burrs, tears, grain boundaries, and irregularities have been reduced to a uniform smooth microscopic featureless surface. Thus, the sprocket support shaft 10 has a surface finish that significantly reduces particle retention, product adhesion, bacterial entrapment, corrosion sites, and radioactive contamination retention.

CLEANING OPERATION

Referring again to FIGS. 4, 8, and 9, if the rotary union 30 is not already installed, the spring retainer clip 21 which is used to retain the plug 22, 33, in the cylindrical end 14 is removed, the cylindrical rotary union 30 is installed on the longer cylindrical end, and the spring retainer clip 21 is replaced with its pin portion 21B extending through the small diameter holes 23 of the cylindrical end 14 (and the transverse bore in the body of the plug 22 in the embodiment of FIGS. 4 and 8) to again secure the plug and retain the rotary union.

A fluid hose equipped with an on-off valve V is connected to the threaded fluid inlet passageway 31 in the side wall of the rotary union 30 to introduce cleaning fluid under pressure into the shaft 10. Cleaning fluid under pressure is introduced into the central cavity 30A of the rotary union 30, passes through the fluid passageway holes 25 in the cylindrical end 14, into the central bores 16 and interior chamber 13 of the shaft 10, and is discharged through the plurality narrow slits 17A and 17B in the side walls of the central portion 11 of the shaft while the shaft is rotating about its longitudinal central axis relative to the rotary union.

The cleaning fluid is discharged under pressure through the slits 17A, 17B in a wide fan spray pattern onto the inside surface of the conveyor belt and through crevasses, joints, hinges, interfaces and openings in the belt to effect cleaning of the belt. The cleaning fluid is simultaneously discharged under pressure through the slits 17A, 17B that are encompassed by the bore 20 of the sprockets and passes between the exterior surfaces of the central portion 11 and interior surfaces of the bore of the sprockets to clean the overlapping surfaces. If the ends of the shaft are supported in non-lubricated bearings 26, the cleaning fluid is also simultaneously discharged under pressure through the holes 24 in the cylindrical ends 14, 15 of the shaft that are encompassed by the bore 26A of the bearings 26 and passes between the exterior surfaces of the cylindrical ends 14, 15 and interior surfaces of the bore of the bearings to clean the overlapping surfaces.

Although the preferred embodiments have been described as having a plurality of elongate narrow slits in each of the side walls portion of the central portion, its should be understood, that each of the side walls may be provided with a single elongate.

While this invention has been described fully and completely with special emphasis upon preferred embodiments, it should be understood that within the scope of the appended claims the invention may be practiced otherwise than as specifically described herein.

The invention claimed is:

1. A nozzleless belt-cleaning sprocket support shaft for cleaning endless conveyor belts, comprising:

a sprocket support shaft having a longitudinal axis, a first end, a second end, a central portion of generally square transverse cross section with parallel spaced opposed side walls defining an interior chamber, and at least one elongate narrow slit integrally formed in each of said side walls along the length of said central portion in fluid communication with said interior chamber; and a plurality of sprockets removably mounted on said central portion of said shaft, each having a generally square central bore with an interior surface received on the exterior surface of said central portion and an outer periphery adapted to engage a conveyor belt; wherein said sprockets and said shaft rotate as a unit about the longitudinal axis of said shaft, and said narrow slits are adapted to discharge a cleaning fluid under pressure in a flat fan spray pattern upon the width of the conveyor belt, and simultaneously discharge the cleaning fluid between the exterior surface of said shaft central portion and said interior surface of said central bore of each of said sprockets.

2. The nozzleless belt-cleaning sprocket support shaft according to claim 1, wherein said at least one slit comprises a plurality of elongate narrow slits integrally formed in each of said side walls in longitudinally spaced apart relation along the length of said central portion in fluid communication with said central chamber.

3. The nozzleless belt-cleaning sprocket support shaft according to claim 2, wherein the space between each of said narrow slits is approximately the same as the length of said slits.

4. The nozzleless belt-cleaning sprocket support shaft according to claim 2, wherein said narrow slits of two said opposed side walls are longitudinally offset from said narrow slits of the adjacent said opposed side walls.

5. The nozzleless belt-cleaning sprocket support shaft according to claim 4, wherein said central bore of at least one of said sprockets is disposed over said narrow slits of two said opposed side walls, and said central bore of an adjacent one of said sprockets is disposed over said longitudinally offset narrow slits of the adjacent said opposed side walls; wherein said narrow slits are adapted to discharge the cleaning fluid between the exterior surface of said shaft central portion and said interior surface of said central bore of each of said sprockets.

6. The nozzleless belt-cleaning sprocket support shaft according to claim 5, wherein a number of said narrow slits of two said opposed side walls, and said adjacent opposed side walls are not covered by said central bore of said sprockets;

said narrow slits that are covered by said central bore are adapted to discharge the cleaning fluid between the exterior surface of said shaft central portion and said interior surface of said central bore of each of said sprockets; and said narrow slits that are not covered by said central bore are adapted to discharge a cleaning fluid under pressure in a flat fan spray pattern upon the width of the conveyor belt.

7. The nozzleless belt-cleaning sprocket support shaft according to claim 1, wherein said first end and said second end are cylindrical ends extending axially outward from said central portion in opposed relation and have a central bore in fluid communication with said interior chamber;

a plug is removably received and sealingly engaged in an outer end of each said central bore; and each of said cylindrical ends is rotatably supported in a central bore of a respective bearing.

8. The nozzleless belt-cleaning sprocket support shaft according to claim 7, further comprising:

a fluid outlet in the side wall of each of said cylindrical ends in fluid communication with its said central bore and said interior chamber;

each said fluid outlet adapted to discharge the cleaning fluid between the exterior surface of the respective cylindrical end and said central bore of said respective bearing.

9. The nozzleless belt-cleaning sprocket support shaft according to claim 8, further comprising:

a fluid inlet in the side wall of said first cylindrical end in fluid communication with its said central bore, each said fluid outlet, and said interior chamber; and a rotary union removably received and rotatably engaged on said first cylindrical end in rotary fluid sealing relation;

said rotary union having an interior fluid cavity in fluid communication with said fluid inlet in said side wall of said first cylindrical end, and a fluid inlet in fluid communication with said central bore adapted to receive the cleaning fluid under pressure.

10. A conveyor belt cleaning method for cleaning endless conveyor belts and the sprockets over which the belt is supported, comprising the steps of:

providing a sprocket support shaft having a longitudinal axis, a first end, a second end, a central portion of generally square transverse cross section with parallel spaced opposed side walls defining an interior chamber, and at least one elongate narrow slit integrally formed in each of said side walls along the length of said central portion in fluid communication with said interior chamber, and a plurality of sprockets mounted on said central portion of said shaft, each having a generally square central bore with an interior surface received on the exterior surface of said central portion and an outer periphery over which the belt is supported; and discharging a cleaning fluid under pressure through said narrow slits in a flat fan spray pattern upon the width of the conveyor belt, and simultaneously discharging the cleaning fluid between the exterior surface of said shaft central portion and said interior surface of said central bore of each of said sprockets.

11. The method according to claim 10, wherein said at least one slit comprises a plurality of elongate narrow slits integrally formed in each of said side walls in longitudinally spaced apart relation along the length of said central portion in fluid communication with said central chamber, a number of said narrow slits of two said opposed side walls, and said adjacent opposed side walls are not covered by said central bore of said sprockets; and said step of discharging cleaning fluid comprises discharging the cleaning fluid through said narrow slits that are covered by said central bore of said sprockets between the exterior surface of said shaft central portion and said interior surface of said central bore of each of said sprockets; and simultaneously discharging the cleaning fluid through said narrow slits that are not covered by said central bore of said sprockets under pressure in a flat fan spray pattern upon the width of the conveyor belt.

12. The method according to claim 10, wherein said first end and said second end are cylindrical ends extending axially outward from said central portion in opposed relation and have a central bore in fluid communication with said interior chamber, a plug is removably received and sealingly engaged in an outer end of each said central bore, each of said cylindrical ends is rotatably supported in a central bore of a respective bearing, and each said cylindrical end has a fluid outlet in its side wall in fluid communication with its said central bore and said interior chamber; and said step of discharging cleaning fluid comprises simultaneously discharging the cleaning fluid through said fluid outlet between the exterior surface of the respective cylindrical end and said central bore of said respective bearing.

* * * * *